United States Patent
Cui et al.

(10) Patent No.: US 12,007,524 B1
(45) Date of Patent: Jun. 11, 2024

(54) METHOD AND SYSTEM FOR NON-DESTRUCTIVE TESTING OF TUNNEL LINING

(71) Applicant: Shenzhen University, Shenzhen Guangdong (CN)

(72) Inventors: Hongzhi Cui, Shenzhen Guangdong (CN); Shuoli Wu, Shenzhen Guangdong (CN); Xiangpeng Cao, Shenzhen Guangdong (CN); Xiaohua Bao, Shenzhen Guangdong (CN); Lele Cao, Shenzhen Guangdong (CN); Xiangsheng Chen, Shenzhen Guangdong (CN)

(73) Assignee: Shenzhen University, Shenzhen (CN)

( * ) Notice: Subject to any disclaimer, the term of this patent is extended or adjusted under 35 U.S.C. 154(b) by 0 days.

(21) Appl. No.: 18/426,886

(22) Filed: Jan. 30, 2024

(30) Foreign Application Priority Data

Feb. 17, 2023 (CN) .......................... 202310126084.2

(51) Int. Cl.
*E21D 11/00* (2006.01)
*G01V 3/12* (2006.01)

(52) U.S. Cl.
CPC ................ *G01V 3/12* (2013.01); *E21D 11/00* (2013.01)

(58) Field of Classification Search
CPC .................................. G01V 3/12; E21D 11/00
See application file for complete search history.

(56) References Cited

FOREIGN PATENT DOCUMENTS

| CN | 207923610 U | * | 9/2018 | ............... G01N 3/12 |
| CN | 110082218 B | * | 6/2020 | ............ G01M 13/00 |

* cited by examiner

*Primary Examiner* — Manuel L Barbee
(74) *Attorney, Agent, or Firm* — Myers Wolin, LLC

(57) ABSTRACT

A method and system are provided for non-destructive testing of a tunnel lining, and relate to the field of tunnel quality testing technologies. The method includes: obtaining tunnel design information; extracting rebar arrangement information and lining information; determining theoretical arrangement interval information; determining location information of a signal conducting bar group; pre-embedding signal conducting bars in sequence based on the location information of the signal conducting bar group; and manufacturing the lining, mounting an interface slot based on a location of the signal conducting bar, and marking a location of each interface slot as input point location information or receiving point location information, wherein the input point location information indicates a location corresponding to the signal input connection point, and the receiving point location information indicates a location corresponding to the signal receiving point.

14 Claims, 12 Drawing Sheets

A transmitting terminal of a main machine inputs a preset digital transmission signal to a signal input connection point, converts the preset digital transmission signal into an analog signal by an encoder mounted on a signal-transmission conducting bar, and transmits the analog signal, and a signal-reception conducting bar receives a waveform signal, converts the waveform signal into a digital reception signal by a decoder on the signal-reception conducting bar, and sends the digital reception signal to a receiving terminal of the main machine ⟵ 400

METHOD AND SYSTEM FOR NON-DESTRUCTIVE TESTING OF TUNNEL LINING

CROSS REFERENCE TO RELATED APPLICATION

This patent application claims the benefit and priority of Chinese Patent Application No. 202310126084.2, filed with the China National Intellectual Property Administration on Feb. 17, 2023, the disclosure of which is incorporated by reference herein in its entirety as part of the present application.

TECHNICAL FIELD

This application relates to the field of tunnel quality test technologies, and in particular to a method and system for non-destructive testing of a tunnel lining.

BACKGROUND

A tunnel is an underground engineering building, and a utilization of underground space by persons. After the tunnel is excavated, original equilibrium of strata around the tunnel is destroyed, causing deformation or collapse of the tunnel. To maintain stability of surrounding rocks and ensure driving safety, the tunnel must have a supporting structure with sufficient strength, namely, a tunnel lining.

Non-destructive testing is gradually popularized in the tunnel lining. A commonly used testing method is to enable an electromagnetic wave to penetrate a lining structure, to obtain information about a defect and a structure inside the lining. In terms of development of a ground penetrating radar, a conventional technology also proposes a three-dimensional ground penetrating radar, a holographic penetrating imaging radar, and a plurality of groups of radar antennas, to enhance a signal and improve test precision. Another portion of technologies propose to perform compensation by using different types of test data, to improve reliability and accuracy of a test result.

With respect to the foregoing relevant technology, the inventor believes that a reinforcing mesh formed with a large quantity of rebars is usually arranged inside the lining. However, the reinforcing mesh has strong shielding effect on an electromagnetic wave signal. Therefore, test precision of a deep tunnel region (for example, a geotechnical layer) on the other side of the lining cannot be guaranteed in a detection process, thus there is still room for improvement.

SUMMARY

To resolve a problem that test precision of a deep tunnel region (for example, a geotechnical layer) on the other side of a lining cannot be guaranteed in a detection process due to strong shielding effect of a reinforcing mesh on an electromagnetic wave signal, this application provides a method and system for non-destructive testing of a tunnel lining.

According to a first aspect, this application provides a method for non-destructive testing of a tunnel lining, and adopts the following technical solutions.

The method for non-destructive testing of a tunnel lining includes:

obtaining tunnel design information before tunnel construction;

extracting rebar arrangement information and lining information based on the tunnel design information;

performing matching analysis on the tunnel design information based on arrangement interval information stored in a preset arrangement database, to determine an arrangement interval corresponding to the tunnel design information, and defining the arrangement interval as theoretical arrangement interval information, where determining location information of a signal conducting bar group based on the lining information and the theoretical arrangement interval information, where each of signal conducting bar groups includes a signal-transmission conducting bar and a signal-reception conducting bar, one end of the signal-transmission conducting bar is a signal transmitting point, the other end of the signal-transmission conducting bar is a signal input connection point, one end of the signal-reception conducting bar is a signal receiving point, and the other end of the signal-reception conducting bar is a signal output connection point;

pre-embedding signal conducting bars in sequence based on the location information of the signal conducting bar group, where the signal transmitting point and the signal receiving point are located on a side, close to a geotechnical layer, of the lining, and the signal input connection point and the signal receiving point are located on a side, away from the geotechnical layer, of the lining; and manufacturing the lining, mounting an interface slot based on a location of the signal conducting bar, and marking a location of each interface slot as input point location information or receiving point location information, where the input point location information indicates a location corresponding to the signal input connection point, and the receiving point location information indicates a location corresponding to the signal receiving point.

When the foregoing technical solution is adopted, during construction of a tunnel, the signal conducting bar is pre-embedded into the lining and extends to a back of the lining, and a circuit interface of the signal conducting bar is reserved inside the tunnel. Therefore, during maintenance and test of the tunnel, a structural state of a rock soil layer may be scanned by bypassing a reinforcement layer of the lining. Therefore, a signal is not shielded by a reinforcing mesh in the lining, so that test effect and test efficiency are improved, and convenience of the non-destructive testing is improved. Furthermore, the reinforcing mesh may be used as a reinforcing bar of the lining, so that structural strength of the lining is improved.

Optionally, the method for non-destructive testing of a tunnel lining further includes a process for testing by a main machine. The process includes:

obtaining first test region information;

performing matching analysis on the first test region information based on the input point location information and the receiving point location information that are stored in a preset distribution database, to determine an input point location and a receiving point location that are corresponding to the first test region information, defining the input point location as current input point location information, and defining the receiving point location as current receiving point location information;

after enabling the main machine to travel to the first test region information along a preset track, inserting a transmitting terminal of the main machine at the current input point location information, to be connected to a corresponding signal input connection point, and inserting a receiving terminal of the main machine at the current receiving point location information, to be connected to a corresponding signal output connection point;

converting, by the transmitting terminal of the main machine, a preset first digital transmission signal into a preset first analog signal by an encoder mounted on the transmitting terminal of the main machine, and inputting the preset first analog signal from a signal input connection point corresponding to the current input point location information, transmitting, by a signal-transmission conducting bar corresponding to the current input point location information, a first analog signal, receiving a preset first waveform signal at a signal-reception conducting bar corresponding to the current receiving point location information, and sending the preset first waveform signal to the receiving terminal of the main machine from a signal-reception connection point corresponding to the current receiving point location information, and converting, by the receiving terminal of the main machine, the preset first waveform signal into a first digital reception signal by a decoder mounted on the receiving terminal of the main machine; or inputting, by the transmitting terminal of the main machine, a preset first digital transmission signal to the signal input connection point, converting the preset first digital transmission signal into a first analog signal by an encoder mounted on the signal-transmission conducting bar, and transmitting the first analog signal, and in addition, receiving, by the signal-reception conducting bar, a first waveform signal, converting the first waveform signal into a first digital reception signal by a decoder mounted on the signal-reception conducting bar, and sending the first digital reception signal to the receiving terminal of the main machine;

analyzing the first digital reception signal, to obtain first test result information;

after obtaining the first test result information, enabling the main machine to travel to a next region until all regions have been tested.

When the foregoing technical solution is adopted, in a test process, provided that the main machine moves by following a specific rule and an interface on the main machine is connected to an interface, extending outside an inner surface of the lining, the signal may be sent from the one end and received from the other end, to obtain a test result. This implements an automatic cruise test, and improves the test efficiency.

Optionally, the method for inserting a transmitting terminal of the main machine at the current input point location information and inserting a receiving terminal of the main machine at the current receiving point location information includes:

determining whether a quantity of current input point location information and current receiving point location information that are activated and that are in the first test region information is greater than one pair;

if the quantity of current input point location information and current receiving point location information that are activated and that are in the first test region information is greater than one pair, obtaining information of a required test signal type and time window information corresponding to the required test signal type;

performing matching analysis based on serial number information of the signal conducting bar group, receiving time window information, and test signal type information that are stored in a preset depth database, to determine a serial number of the signal conducting bar group and a receiving time window that are corresponding to the required test depth information and the test signal type information, defining the serial number of the signal conducting bar group as serial number information of the required signal conducting bar group, and defining the receiving time window as required receiving time window information;

updating the current input point location information and the current receiving point location information based on the serial number information of the required signal conducting bar group and the location information of the signal conducting bar group;

inserting the transmitting terminal of the main machine at the current input point location information, inserting the receiving terminal of the main machine at the current receiving point location information, and receiving a signal based on the required receiving time window information; or if the quantity of current input point location information and current receiving point location information that are activated and that are in the first test region information is not greater than one pair, directly inserting the transmitting terminal of the main machine at the current input point location information, and inserting the receiving terminal of the main machine at the current receiving point location information.

When the foregoing technical solution is adopted, different input points and output points may be accessed based on different required depths. When the geotechnical layer is tested, a test depth is controlled by setting a time window, different locations and depths in the lining can be tested through the signal conducting bar. A type of a test signal may be set, to enable the test to be more comprehensive and reliable. This improves comprehensiveness of the test.

Optionally, the method for non-destructive testing of a tunnel lining further includes the method for processing transmission and reception of a signal after inserting a transmitting terminal of the main machine at the current input point location information and inserting a receiving terminal of the main machine at the current receiving point location information. The method includes:

the transmitting terminal of the main machine inputs a preset digital transmission signal to the signal input connection point, converts the preset digital transmission signal into an analog signal by an encoder mounted on the signal-transmission conducting bar, and transmits the analog signal, and in addition, the signal-reception conducting bar receives a waveform signal, converts the waveform signal into a digital reception signal by a decoder mounted on the signal-reception conducting bar, and sends the digital reception signal to the receiving terminal of the main machine.

When the foregoing technical solution is adopted, the encoder and the decoder are mounted on the signal conducting bar, and the main machine only needs to provide the test signal and receive an echo signal, without carrying a plurality of devices. Therefore, the main machine is lightweight and easy to be carried, so that convenience of the main machine is improved.

Optionally, the method for pre-embedding signal conducting bars in sequence based on the location information of the signal conducting bar group includes:
- determining staggered location information based on the rebar arrangement information and the location information of the signal conducting bar group;
- determining whether the staggered location information exists;
- if the staggered location information exists, determining staggered signal conducting bar information in the location information of the signal conducting bar group based on the staggered location information;
- coating a rubber material on a surface of a rebar, and injecting epoxy resin between the rubber material and the rebar; or
- if the staggered location information does not exist, determining conventional signal conducting bar information based on the location information of the signal conducting bar group; and
- coating epoxy resin on a surface of a rebar.

When the foregoing technical solution is adopted, if the signal conducting bar may not be disposed independently and is easy to be in contact with another rebar, the epoxy resin material is coated on the signal conducting bar, to ensure that the signal conducting bar is not easy to be affected by another metal when transmitting the signal. This improves integrity and accuracy of signal transmission.

Optionally, the method for non-destructive testing of a tunnel lining further includes another process for testing by a main machine. The process includes:
- obtaining second test region information;
- performing matching analysis on the second test region information based on serial number information of an input line and serial number information of a receiving line that are stored in a preset line database, to determine a serial number of an input line and a serial number of a receiving line that are corresponding to the second test region information, defining the serial number of the input line as serial number information of a current input line, and defining the serial number of the receiving line as serial number information of a current receiving line;
- inputting, at a line of the serial number information of the current input line, a preset second analog signal that is converted by an encoder mounted on a transmitting terminal of the main machine, transmitting, by a signal-transmission conducting bar corresponding to the serial number information of the current input line, the preset second analog signal, receiving a second waveform signal at a signal-reception conducting bar corresponding to the serial number information of the current receiving line, transmitting the second waveform signal to a receiving terminal of the main machine from a line of the serial number information of the current receiving line, and converting the second waveform signal into a second digital reception signal by a decoder mounted on the receiving terminal of the main machine;
- analyzing the second digital reception signal, to obtain second test result information; and
- after obtaining the second test result information, enabling the main machine to travel to a next region until all regions have been tested.

When the foregoing technical solution is adopted, by connecting all signal input ports and signal receiving ports to the main machine through a circuit, only a corresponding circuit is connected, without enabling the main machine to move to a corresponding location in the tunnel. This improves convenience for connecting the main machine.

Optionally, the method for analyzing the second digital reception signal to obtain second test result information includes:
- arbitrarily selecting a serial number of a line corresponding to the serial number information of the receiving line, and defining the serial number information of the receiving line as serial number information of a checked receiving line;
- while receiving the second waveform signal at the signal-reception conducting bar corresponding to the serial number information of the current receiving line, receiving a checked waveform signal at a signal-reception conducting bar corresponding to the serial number information of the checked receiving line, transmitting, at a line of the serial number information of the checked receiving line, the checked waveform signal to the receiving terminal of the main machine, and converting the checked waveform signal into a checked digital reception signal by using the decoder mounted on the receiving terminal of the main machine;
- determining current receiving spacing information and checked receiving spacing information based on the location information of the signal conducting bar group, the serial number information of the checked receiving line, the serial number information of the current receiving line, and the serial number information of the current input line
- separately performing matching analysis on the current receiving spacing information and the checked receiving spacing information based on processing manner information stored in a preset integration database, to determine a signal processing manner that is separately corresponding to the current receiving spacing information and the checked receiving spacing information, defining the processing manner corresponding to the current receiving spacing information as current processing manner information, and defining the processing manner corresponding to the checked receiving spacing information as checked processing manner information;
- processing the second digital reception signal based on current processing manner information, to obtain second fuzzy test result information;
- processing the checked digital reception signal based on checked processing manner information, to obtain checked fuzzy test result information; and
- integrating the second fuzzy test result information with checked fuzzy test result information, to obtain the second test result information.

When the foregoing technical solution is adopted, a same test target is tested from various angles in a one-transmit and multiple-receive manner, and analyzed to obtain a more accurate test result. This improves accuracy of the test result.

Optionally, the method for processing the checked digital reception signal based on checked processing manner information to obtain checked fuzzy test result information includes:
- analyzing receiving time information of a peak of a signal in the checked digital reception signal;
- determining whether a quantity of receiving time information of the peak is greater than or equal to two;
- if the quantity of receiving time information of the peak is greater than or equal to two, performing matching analysis on all pieces of receiving time information of the peak in sequence based on transmit-receive distance information stored in a preset structural database, to determine a transmit-receive distance corresponding to different receiving time information of the peak, and defining the transmit-receive distance corresponding to the receiving time information as checked transmit-receive distance information;

determining serial number information of a checked input line based on the checked transmit-receive distance information, the serial number information of the checked receiving line, and the location information of the signal conducting bar group;

performing matching on the serial number information of the current input line based on the serial number information of the checked input line, to determine receiving time information of the peak corresponding to the serial number information of the current input line, and defining the receiving time information of the peak as actual receiving time information of the peak;

extracting a waveform signal in the checked digital reception signal based on the actual receiving time information of the peak, after removing remaining waveform signals, updating the checked digital reception signal, and processing the checked digital reception signal based on the checked processing manner information, to obtain the checked fuzzy test result information; or if the quantity of receiving time information of the peak is less than two, processing the checked digital reception signal based on checked processing manner information, to obtain checked fuzzy test result information.

When the foregoing technical solution is adopted, by decomposing of an amplitude of a signal received at the receiving terminal, an amplitude that conforms to a distance between the signal-transmission conducting bar and the signal-reception conducting bar is screened, and signals of remaining amplitudes are removed to obtain a required signal corresponding to the serial number information of the current input line. This improves accuracy of the test result information. Optionally, the method for non-destructive testing of a tunnel lining further includes a method for checking the second test result information. The method includes:

obtaining theoretical location information of a marker;

determining lining change condition information based on the second test result information;

determining theoretical change location information of the marker based on the lining change condition information and the theoretical location information of the marker;

analyzing test location information of the marker based on the second test result information;

determining whether the theoretical change location information of the marker is consistent with the test location information of the marker;

if the theoretical marker change location information is consistent with the marker test location information, normally outputting the second test result information;

if the theoretical change location information of the marker is inconsistent with the test location information of the marker, determining deviation magnitude information based on the theoretical marker change location information and the marker test location information;

performing matching analysis on the deviation magnitude information based on a proportional weight information stored in a preset proportion database, to determine a proportional weight corresponding to the deviation magnitude information, and defining the proportional weight as corrected proportion information; and correcting the processing manner information based on the proportional weight.

When the foregoing technical solution is adopted, the marker is disposed to check whether the test result is accurate, to analyze an error caused by a customer factor. This enables the test result is more accurate, and accuracy of the testing is improved.

According to a second aspect, this application provides a system for non-destructive testing of a tunnel lining, and adopts the following technical solutions.

The system for non-destructive testing of a tunnel lining includes an obtaining module, a memory, and a processor.

The obtaining module is configured to obtain tunnel design information, first test region information, required test depth information, test signal type information, second test region information, and theoretical location information of a marker.

The memory is configured to store a program for a method for controlling any of the foregoing method for non-destructive testing of a tunnel lining.

In the processor, the program in the memory is loaded and executed by the processor, to implement the method for controlling any of the foregoing method for non-destructive testing of a tunnel lining.

When the foregoing technical solution is adopted, during construction of a tunnel, the signal conducting bar is pre-embedded into the lining and extends to a back of the lining, and a circuit interface of the signal conducting bar is reserved inside the tunnel. Therefore, during maintenance and test of the tunnel, a structural state of a rock soil layer may be scanned by bypassing a reinforcement layer of the lining. Therefore, a signal is not shielded by a reinforcing mesh in the lining, so that test effect and test efficiency are improved, and convenience of the non-destructive testing is improved. Furthermore, the reinforcing mesh may be used as a reinforcing bar of the lining, so that structural strength of the lining is improved.

To sum up, this application has at least beneficial effect below:

1. The signal conducting bar is pre-embedded into the lining and extends to a back of the lining. Therefore, during maintenance and test of the tunnel, the signal is not shielded by the reinforcing mesh in the lining, so that the test effect and the test efficiency are improved, and the convenience of the non-destructive testing is improved.

2. A same test target is tested from various angles in a one-transmit and multiple-receive manner, and analyzed to obtain a more accurate test result. This improves the accuracy of the test result.

BRIEF DESCRIPTION OF THE DRAWINGS

FIG. 5 is a flowchart of another method for processing transmission and reception of a signal after inserting a transmitting terminal of a main machine at current input point location information and inserting a receiving terminal of the main machine at current receiving point location information for signal transmission and signal reception according to an embodiment 2 of this application;

DETAILED DESCRIPTION OF THE EMBODIMENTS

To make the objectives, technical solutions, and advantages of this application clearer, this application is further described in detail below with reference to the accompanying drawings 1 to 12 and embodiments. It should be understood that the examples described herein are merely used to explain this application, rather than to limit this application.

Embodiment 1

Figure 1:
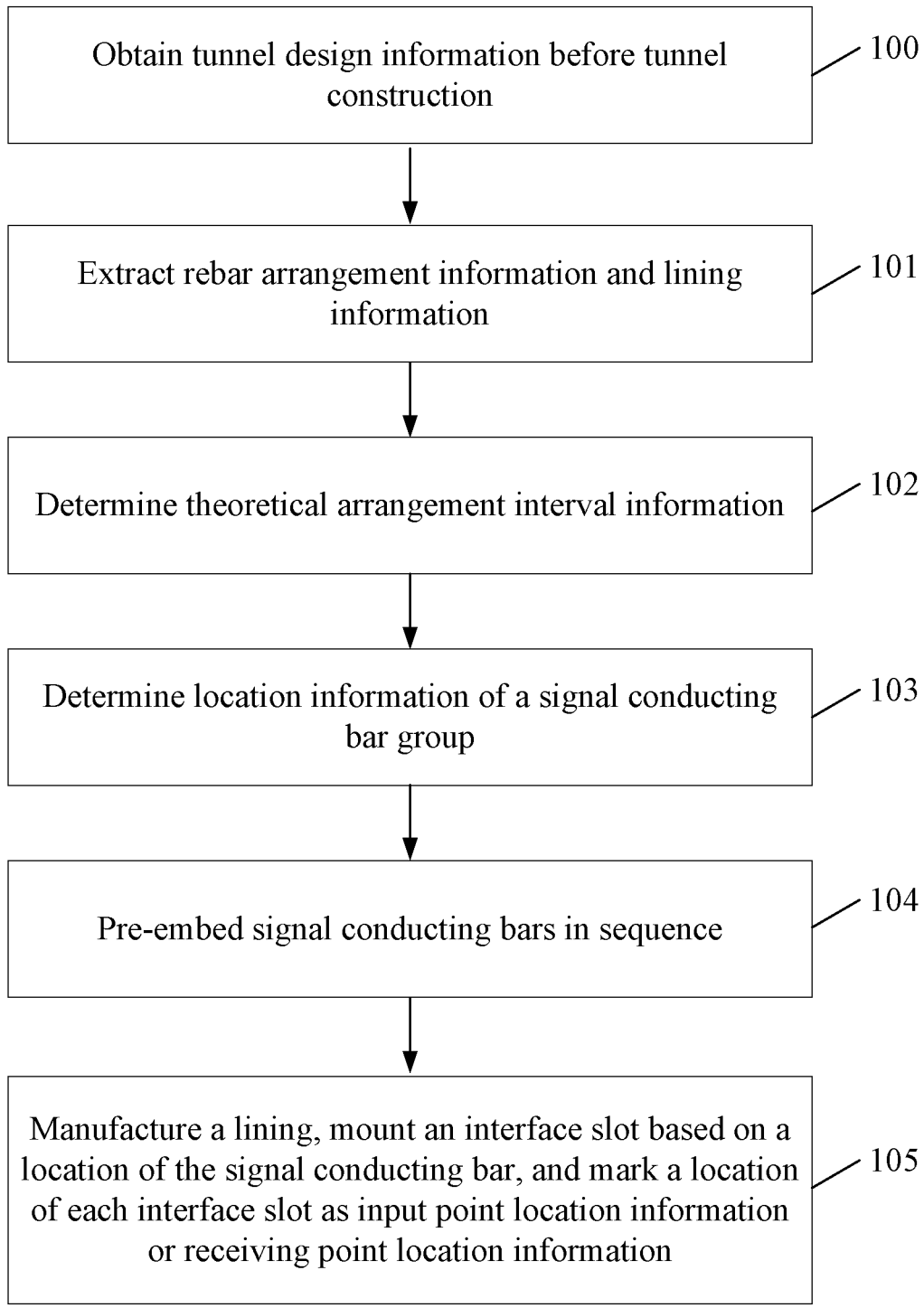
FIG. 1 is a flowchart of a method for non-destructive testing of a tunnel lining according to an embodiment 1 of this application.

An embodiment of this application discloses a method for non-destructive testing of a tunnel lining. Referring to FIG. 1, a method for non-destructive testing of a tunnel lining includes the following steps.

Step 100: Obtain tunnel design information before tunnel construction.

The tunnel design information is design drawing information of a tunnel, including an excavation diameter, a lining thickness, and the like. An obtaining manner is to manually input or import data.

Step 101: Extract rebar arrangement information and lining information based on the tunnel design information.

Figure 2:
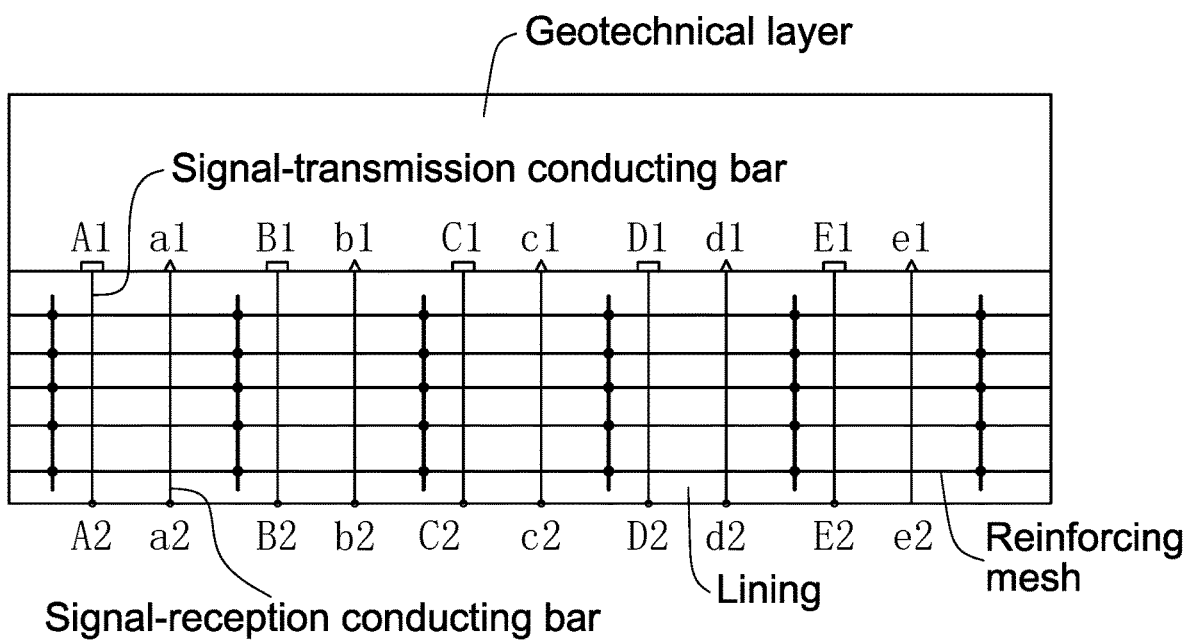
FIG. 2 is a schematic diagram of a structure of a turning lining according to an embodiment 1 of this application.

The rebar arrangement information is about arrangement of rebars, including a region, length, and location for the arrangement of the rebars. FIG. 2 shows a cross-section image of a lining structure in a length direction. A lower side of the lining is an inner side of the lining, and used to form a passageway for vehicles or pedestrians to pass through. A geotechnical layer is located on an upper side of the lining, and a reinforcing mesh is located at a middle part of the lining, to improve structural strength of the lining. An extracting manner is to directly recognize a location and direction of a color of a reinforcing mesh in the diagram. The lining information is about a structure, material, spatial location, and the like of the lining.

Step 102: Perform matching analysis on the tunnel design information based on arrangement interval information stored in a preset arrangement database, to determine an arrangement interval corresponding to the tunnel design information, and defining the arrangement interval as theoretical arrangement interval information The theoretical arrangement interval information is about an interval distance that is in a length direction of an arc of a lining between a signal conducting bar added to the lining and rebars on two sides each, and information about an interval distance between a signal conducting bar and a signal conducting bar. A mapping relationship between the arrangement interval information and the tunnel design information is stored in a database. After persons skilled in art dispose the reinforcing mesh according to different functions and a safety level of a graded tunnel, a test spacing is manually calculated and set based on a test requirement and a testing specification, and a mapping relationship between the arrangement interval information and the tunnel design information is stored in the database. When receiving corresponding rebar arrangement information, a system automatically finds a corresponding arrangement interval from the database, and outputs the corresponding arrangement interval as the theoretical arrangement interval information.

Step 103: Determine location information of a signal conducting bar group based on the lining information and the theoretical arrangement interval information, where each of signal conducting bar groups includes a signal-transmission conducting bar and a signal-reception conducting bar, one end of the signal-transmission conducting bar is a signal transmitting point, and the other end of the signal-transmission conducting bar is a signal input connection point; and one end of the signal-reception conducting bar is a signal receiving point, and the other end of the signal-reception conducting bar is a signal output connection point.

The location information of the signal conducting bar group is information about a combined location formed by one signal-transmission conducting bar and one signal-reception conducting bar. As shown in FIG. 2, A1A2, B1B2, C1C2, D1D2, and E1E2 are signal-transmission conducting bars, and a1a2, b1b2, c1c2, d1d2, and e1e2 are signal-reception conducting bars. A1A2 and a1a2 form a signal conducting bar group, locations of the two are location information of one signal conducting bar group. As shown in FIG. 2, A1 is a signal transmitting point, and A1 is located on a side, close to the geotechnical layer, of the lining. A2 is a signal input connection point, and A2 is located on a side, away from the geotechnical layer, of the lining, that is, a side, close to an inner surface, of the lining. a1 is a signal receiving point, and a1 is located on a same side of A1. a2 is a signal output connection point, and a2 is located on a same side of A2. A determining method is to distinguish the reinforcing mesh into a length direction of a vertical lining and a length direction of a parallel lining as shown in FIG. 2, arrange the signal conducting bar group in parallel to a perpendicular rebar, where spacing between rebars on two sides is spacing in the theoretical arrangement interval information, enable A1 and a1 to extend to a junction of the geotechnical layer and the lining, enable A2 and a2 to extend to the inner surface of the lining, and determine location information from a CAD drawing. The signal transmitting point and the signal receiving point may be disposed inside the reinforcement layer of the lining, to test an inner part of the reinforcing mesh of the lining, may be disposed on a contact surface between the lining and the geotechnical layer, or may be embedded in the geotechnical layer, to test rock outside the tunnel.

Step 104: Pre-embed signal conducting bars in sequence based on the location information of the signal conducting bar group, where the signal transmitting point and the signal receiving point are located on a side, close to a geotechnical layer, of the lining, and the signal input connection point and the signal receiving point are located on a side, away from the geotechnical layer, of the lining.

Step 105: Manufacture the lining, mount an interface slot based on a location of the signal conducting bar, and mark a location of each interface slot as input point location information or receiving point location information, where the input point location information indicates a location corresponding to the signal input connection point, and the receiving point location information indicates a location corresponding to the signal receiving point.

The input point location information is about a location of an interface slot from which a signal is input. The receiving point is information about the location of an interface slot from which the signal is received. The interface slot is located at the signal input connection point and the signal output connection point, to insert a data connection cable of an external main machine into the interface slot, thereby transmitting the signal to the geotechnical layer over the reinforcing mesh, and receiving the signal from the geotechnical layer.

Figure 3:
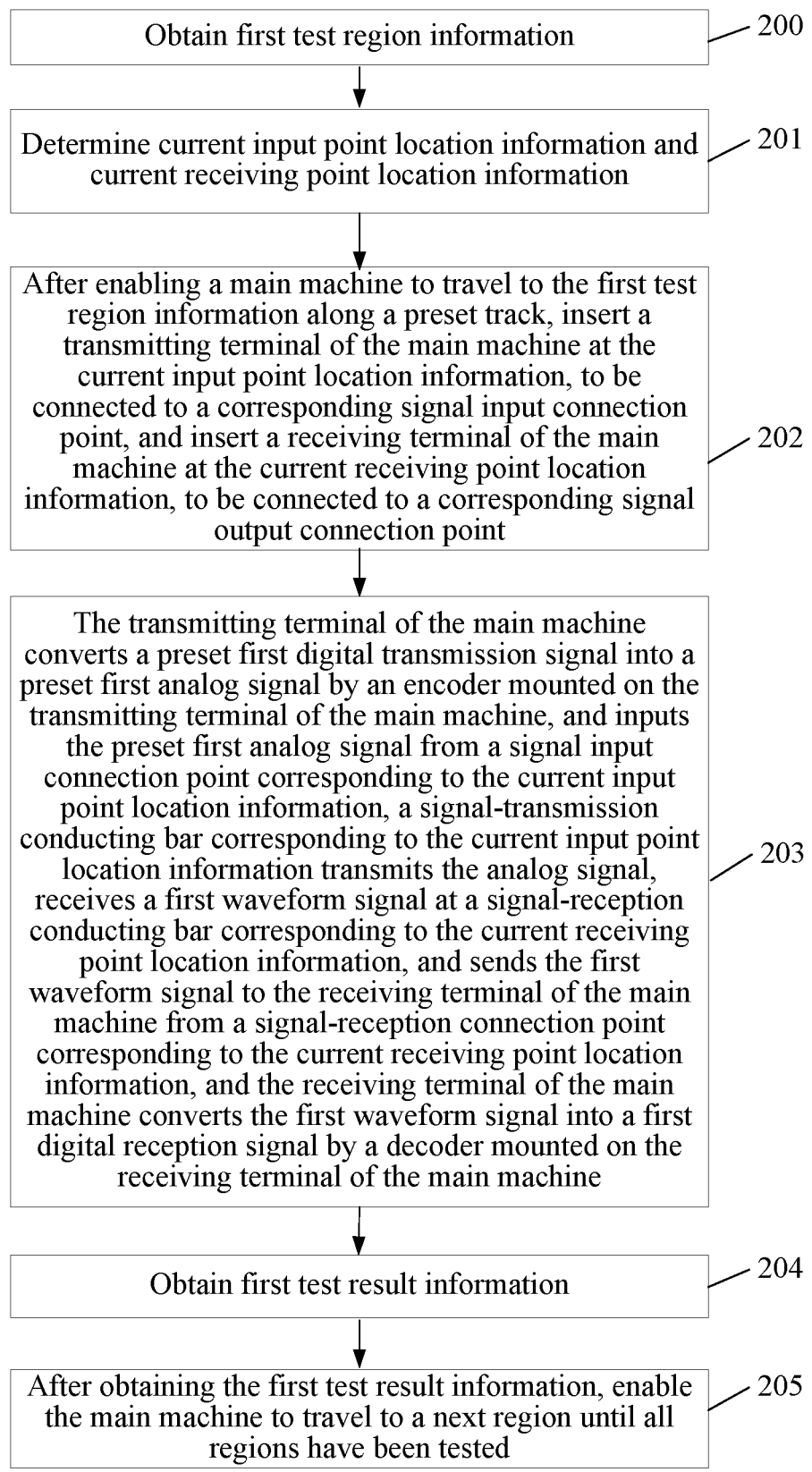
FIG. 3 is a flowchart of a process for testing by a main machine according to an embodiment 1 of this application.

Referring to FIG. 3, the method for non-destructive testing of a tunnel lining further includes a process for testing by a main machine. The process includes the following steps.

Step 200: Obtain first test region information.

The first test region information is about a region being tested, and obtained after the main machine travels to a specific region and automatically recognizes a range of the region in which the main machine is located. Alternatively, the first test region information may be information about a region that is automatically recognized based on a signal when the signal sent by a signal transmitting apparatus disposed in the region is received.

Step 201: Perform matching analysis on the first test region information based on the input point location information and the receiving point location information that are stored in a preset distribution database, to determine an input point location and a receiving point location that are corresponding to the first test region information, define the input point location as current input point location information, and define the receiving point location as current receiving point location information.

The current input point location information is about a location of a signal input connection point of a signal-transmission conducting bar in a signal conducting bar group that is capable of testing a condition of a geotechnical layer in the region. The current receiving point location information is about a location of a signal-reception connection point of a signal-reception conducting bar in the signal conducting bar group that is capable of testing a condition of a geotechnical layer in the region. A mapping relationship between the input point location information and the receiving point location information each and the first test region information is stored in a database, and is obtained by inputting by persons skilled in the art after measurement based on an actual mounting situation. When receiving the first test region information, the system automatically finds a corresponding input point location and receiving point location from the database, and outputs the corresponding input point location and receiving point location as the current input point location information and the current receiving point location information.

Step 202: After enabling the main machine to travel to the first test region information along a preset track, insert a transmitting terminal of the main machine at the current input point location information, to be connected to a corresponding signal input connection point, and insert a receiving terminal of the main machine at the current receiving point location information, to be connected to a corresponding signal output connection point.

A cruise track is mounted inside the tunnel. In combination with an automated control system, a main machine such as a radar is enabled to implement an automatic cruise test. There are interfaces for a plurality of channels on the main machine. A portion of the interfaces are used to connect to the signal input connection point, to transmit a corresponding test signal. Another portion of the interfaces are used to connect to the signal output connection point, to receive a waveform signal back from the signal-reception conducting bar by selectively activating a specific channel. This facilitates a connection and improves convenience for operations.

Step 203: A transmitting terminal of the main machine converts a preset first digital transmission signal into a preset first analog signal by an encoder mounted on a transmitting terminal of the main machine, and inputs the preset first analog signal from a signal input connection point corresponding to the current input point location information. A signal-transmission conducting bar corresponding to the current input point location information transmits an analog signal, receives a preset first waveform signal at a signal-reception conducting bar corresponding to the current receiving point location information, and sends the preset first waveform signal to the receiving terminal of the main machine from a signal-reception connection point corresponding to the current receiving point location information. The receiving terminal of the main machine converts the preset first waveform signal into a first digital reception signal by a decoder mounted on the receiving terminal of the main machine.

The first digital transmission signal is a signal set for testing a deep lining. The first analog signal is a signal that may be transmitted in the geotechnical layer and is a signal obtained after the first digital transmission signal is encoded by the encoder. The first waveform signal is a signal that is received by the signal-reception conducting bar after the first analog signal is transmitted in the geotechnical layer. The first digital reception signal is a signal that can be recognized by the main machine and form a test image and is a signal obtained after the first waveform signal is decoded by the decoder.

Step 204: Analyze the first digital reception signal, to obtain first test result information.

The first test result information is information of the test image, including test data of the inner part of the lining, for example, a depth, a crack, and the like. An analysis manner is to perform converting by the main machine according to an algorithm.

Step 205: After obtaining the first test result information, the main machine travels to a next region until all regions have been tested.

Figure 4:
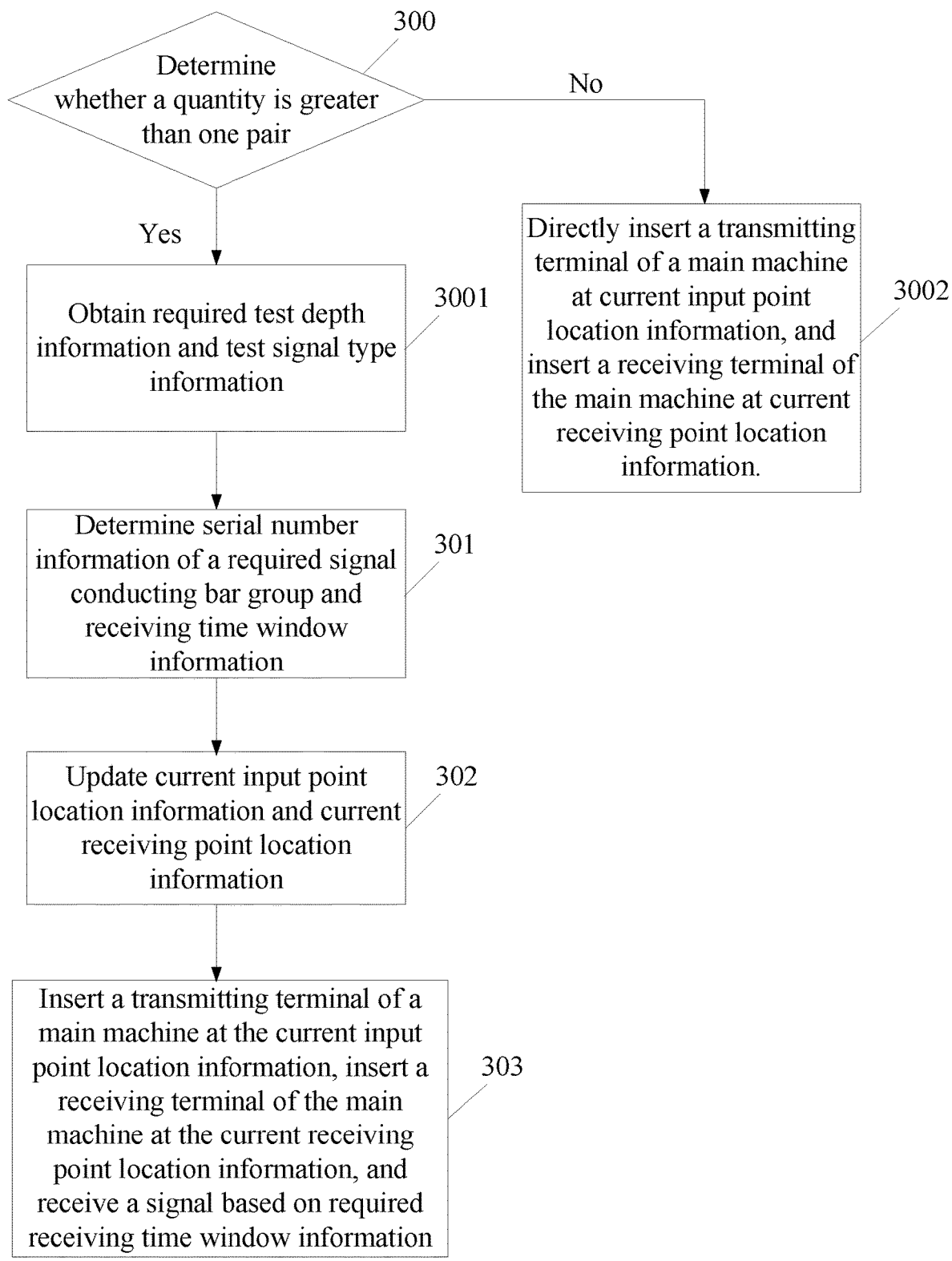
FIG. 4 is a flowchart of a method for inserting a transmitting terminal of a main machine at current input point location information and inserting a receiving terminal of the main machine at current receiving point location information according to an embodiment 1 of this application.

Referring to FIG. 4, the method for inserting a transmitting terminal of a main machine at current input point location information and inserting a receiving terminal of the main machine at current receiving point location information includes the following steps.

Step 300: Determine whether a quantity of current input point location information and current receiving point location information that are activated and that are in first test region information is greater than one pair.

Step 3001: If the quantity of current input point location information and current receiving point location information that are activated and that are in first test region information is greater than one pair, obtain required test depth information and test signal type information.

The required test depth information is about a depth at which the test needs to be performed in the region, and the test signal type information is about a signal that needs to be sent for the test. Because different signals are used to test different test data, a plurality of signal conducting bars may be disposed for testing.

Step 3002: If the quantity of current input point location information and current receiving point location information that are activated and that are in first test region information is not greater than one pair, directly insert the transmitting terminal of the main machine at the current input point location information, and insert the receiving terminal of the main machine at the current receiving point location information.

Step 301: Perform matching analysis on the required test depth information and the test signal type information based on serial number information of a signal conducting bar group and receiving time window information that are stored in a preset depth database, to determine a serial number of the signal conducting bar group and a receiving time window that are corresponding to the required test depth information and the test signal type information, define the serial number of the signal conducting bar group as serial number information of the required signal conducting bar group, and define the receiving time window as required receiving time window information.

The serial number information of the required signal conducting bar group is serial number information of a corresponding required signal conducting bar group of which a test depth is the required test depth information and a signal type is the test signal type information. A mapping relationship between the serial number information of the signal conducting bar group and the required test depth information and the test signal type information each is stored in a database. The mapping relationship is obtained by inputting by persons skilled in the art based on an actual mounting condition. The mounting condition is that a plurality of signal conducting bar groups may be disposed at different depths in a same region to transfer different test signals, and each signal conducting bar group is numbered. When receiving the required test depth information and the test signal type information, a system automatically finds a serial number of a corresponding signal conducting bar group from the database, and outputs the serial number of the corresponding signal conducting bar group as the serial number information of the required signal conducting bar group.

Step 302: Update the current input point location information and the current receiving point location information based on the serial number information of the required signal conducting bar group and the location information of the signal conducting bar group.

Step 303: Insert the transmitting terminal of the main machine at the current input point location information, insert the receiving terminal of the main machine at the current receiving point location information, and receive a signal based on the required receiving time window information.

Embodiment 2

Differences between this embodiment and the embodiment 1 lie in that:

Referring to FIG. 5, the method for non-destructive testing of a tunnel lining further includes a method for inserting a transmitting terminal of a main machine at current input point location information and inserting a receiving terminal of the main machine at current receiving point location information for performing signal transmission and reception, and the method includes the following steps.

Step 400: A transmitting terminal of the main machine inputs a preset digital transmission signal to a signal input connection point, converts the preset digital transmission signal into an analog signal by an encoder mounted on the signal-transmission conducting bar, and transmits the analog signal. In addition, the signal-reception conducting bar receives a waveform signal, converts the waveform signal into a digital reception signal by a decoder mounted on the signal-reception conducting bar, and sends the digital reception signal to the receiving terminal of the main machine.

The encoder and decoder are not installed in the main machine, and are instead mounted on corresponding conducting bars. This may increase the costs of the encoder and decoder, but the main machine without the decoder and encoder a relatively small size with reduced burden, which makes it more convenient for transportation and carriage.

Figure 6:
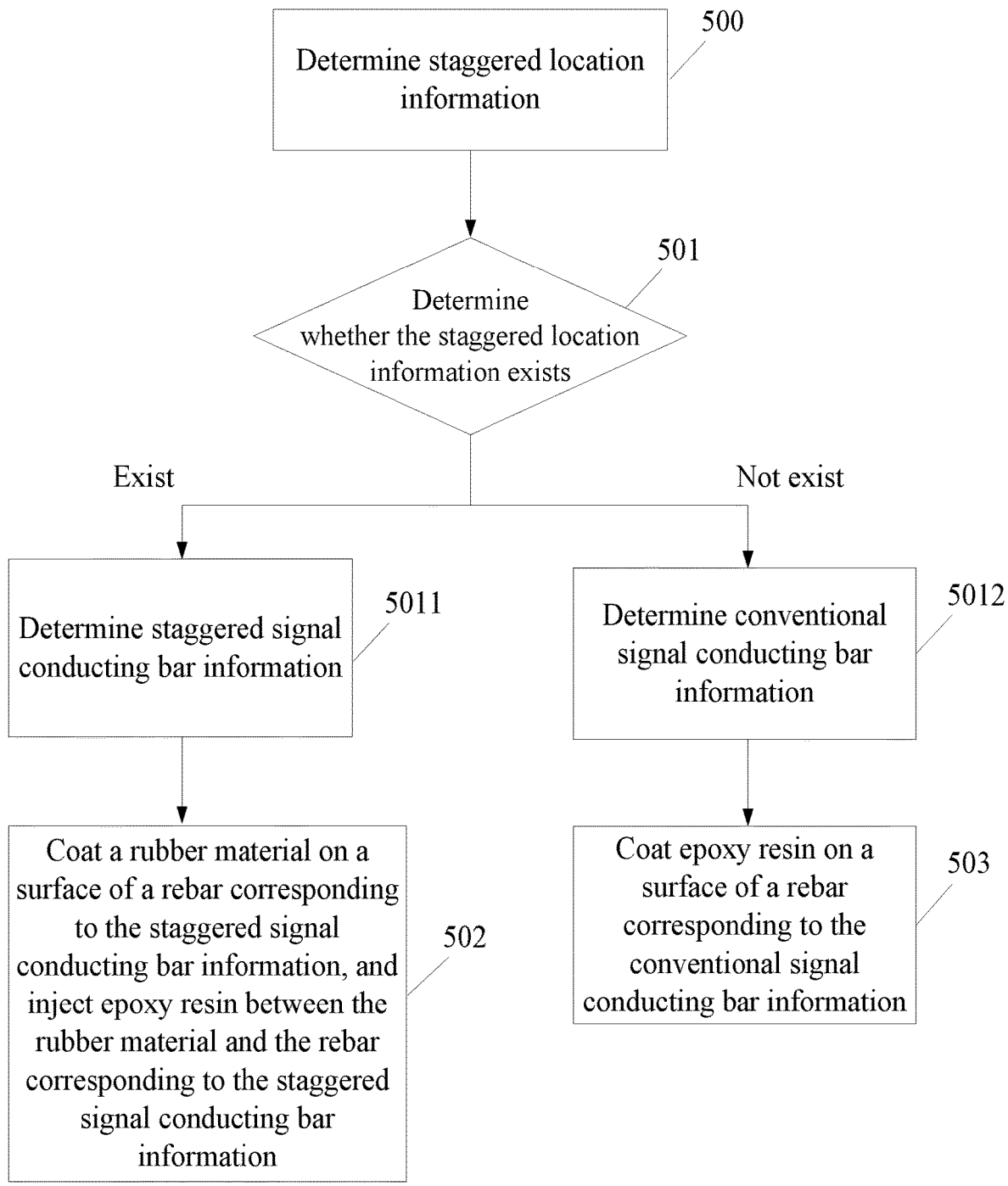
FIG. 6 is a flowchart of a method for pre-embedding signal conducting bars in sequence based on location information of a signal conducting bar group according to an embodiment 2 of this application.

Referring to FIG. 6, a method for pre-embedding signal conducting bars in sequence based on location information of a signal conducting bar group includes the following steps.

Step 500: Determine staggered location information based on rebar arrangement information and location information of the signal conducting bar group.

The staggered location information is about a location at which a reinforcing mesh and the signal conducting bar group are staggered. A determining manner is to compare coordinates of a reinforcing mesh with coordinates of the signal conducting bar group.

Step 501: Determine whether the staggered location information exists.

Step 5011: If the staggered location information exists, determine staggered signal conducting bar information in the location information of the signal conducting bar group based on the staggered location information.

The staggered signal conducting bar information is about a signal conducting bar having coordinates in the staggered location information.

Step 5012: If the staggered location information does not exist, determine conventional signal conducting bar information based on the location information of the signal conducting bar group.

The conventional signal conducting bar information is about a signal conducting bar that does not have the staggered location information. Except for the staggered signal conducting bar information, the remaining are conventional signal conducting bar information.

Step 502: Coat a rubber material on a surface of a rebar, and injecting epoxy resin between the rubber material and the rebar.

The rubber material and the epoxy resin material are coated, when the signal conducting bar transmits a signal, the signal is not affected by another metal.

Step 503: Coat epoxy resin on a surface of a rebar.

Embodiment 2

Figure 7:
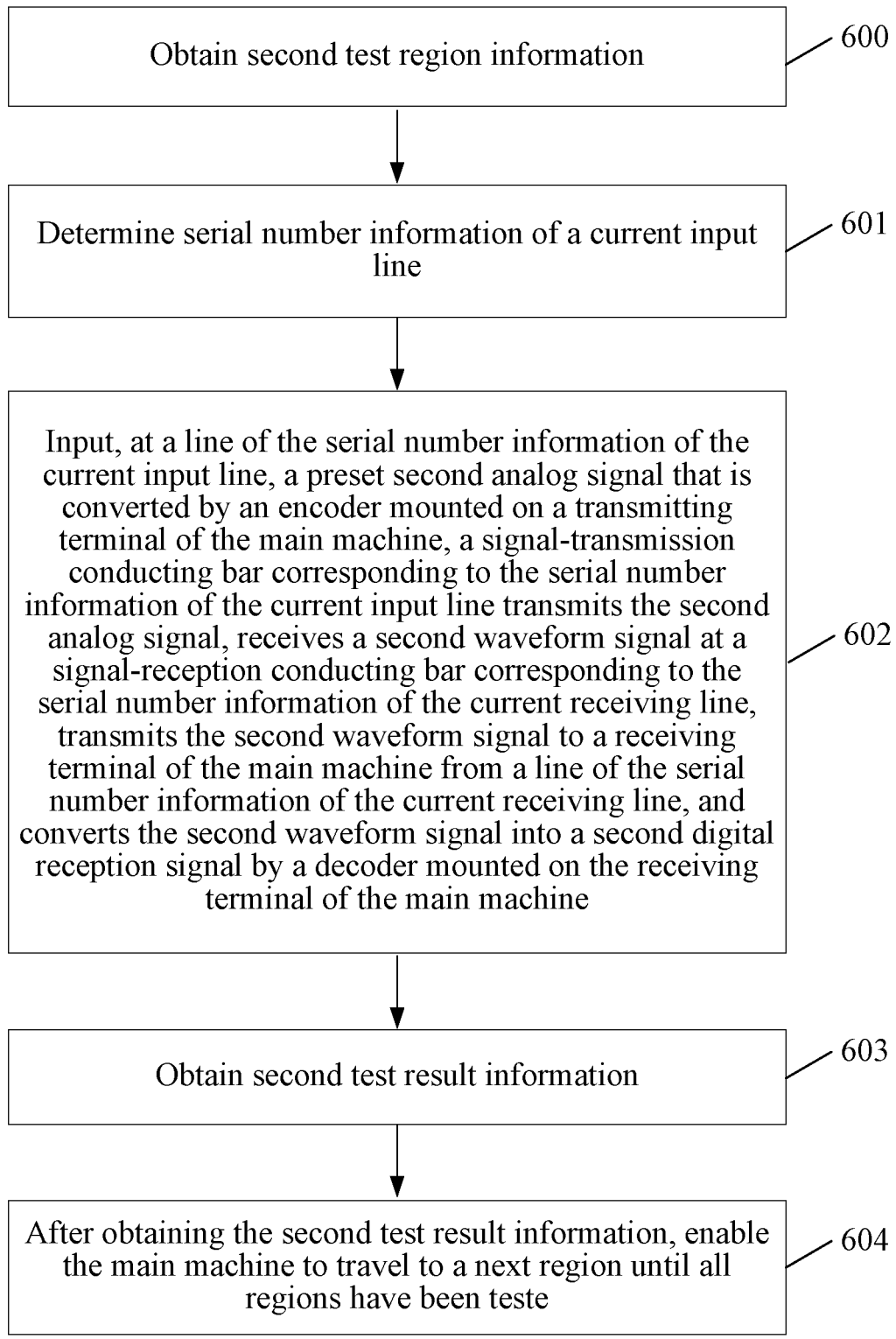
FIG. 7 is a flowchart of another method for testing by a main machine according to an embodiment 3 of this application.

Differences between this embodiment and the embodiment 1 lie in that:

Referring to FIG. 7, the method for non-destructive testing of a tunnel lining further includes a process for testing by a main machine. The method includes the following steps.

Step 600: Obtain second test region information.

The second test region information is the same as first test region information, a difference lies in that a method for distinguishing the two is not a method used.

Step 601: Perform matching analysis on the second test region information based on serial number information of an input line and serial number information of a receiving line that are stored in a preset line database, to determine a serial number of an input line and a serial number of a receiving line that are corresponding to the second test region information, define the serial number of the input line as serial number information of a current input line, and define the serial number of the receiving line as serial number information of a current receiving line.

Figure 8:
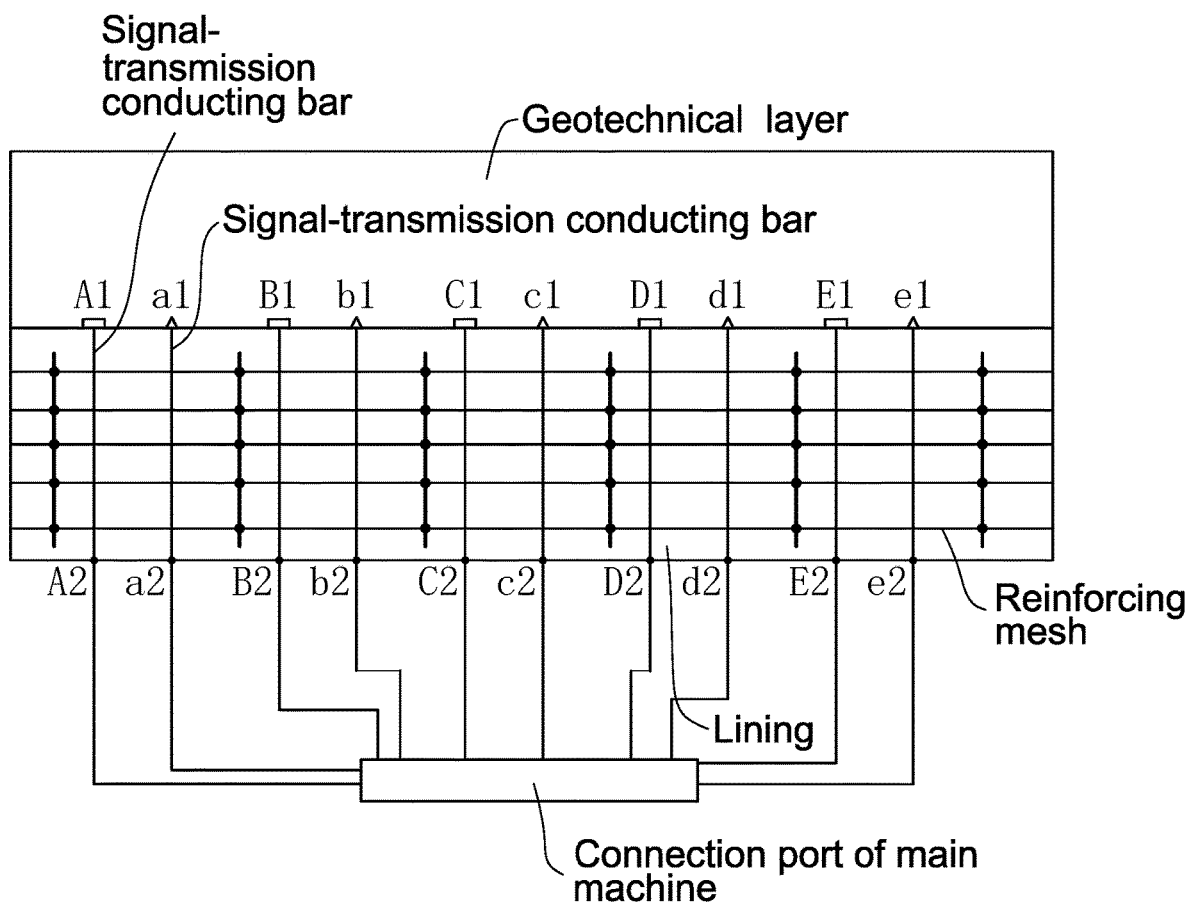
FIG. 8 is a schematic diagram of a structure of a tunnel lining according to an embodiment 3 of this application.

The serial number information of the current input line is information about a serial number of a line connected to a signal input connection point of a signal-transmission conducting bar. The serial number information of the current receiving line is information about a serial number of a line connected to a signal output connection point of a signal-reception conducting bar. As shown in FIG. 8, a connection port of the main machine is disposed at a location in a tunnel, and all signal input connection points and signal output connection points are connected through a wire, and the other end of the wire is connected to the connection port of the main machine, to enable the main machine to complete the function and the purpose of step 202 provided that a corresponding circuit at a location of the connection port of the main machine is connected. A mapping relationship between the serial number information of the input line and the serial number information of the receiving line each and the second test region information is stored in the database. Lines are numbered by persons skilled in the art based on a mounting result, and recorded in the database after being corresponded one by one. When receiving the second test region information, a system automatically finds a corresponding serial number of the input line and a corresponding serial number of the receiving line from the database, and outputs the corresponding serial number of the input line and the corresponding serial number of the receiving line as the serial number information of the current input line and the serial number information of the current receiving line.

Step 602: Input, at a line of the serial number information of the current input line, a preset second analog signal that is converted by an encoder mounted on a transmitting terminal of the main machine. A signal-transmission conducting bar corresponding to the serial number information of the current input line transmits the preset second analog signal, receives a second waveform signal at a signal-reception conducting bar corresponding to the serial number information of the current receiving line, transmits the second waveform signal to a receiving terminal of the main machine from a line of the serial number information of the current receiving line, and converts the second waveform signal into a second digital reception signal by a decoder mounted on the receiving terminal of the main machine.

The second digital transmission signal is a signal set for testing a deep lining, and similar to the first digital transmission signal, is used to distinguish the steps only. The second analog signal is a signal that may be transmitted in a geotechnical layer, and a signal obtained after the second digital transmit signal is encoded by the encoder. The second waveform signal is a signal that is received by the signal-reception conducting bar after the second analog signal is transmitted in the geotechnical layer. The second digital reception signal is a signal that can be recognized by the main machine and form a test image and is a signal obtained after the second waveform signal is decoded by the decoder.

Step 603: Analyze the second digital reception signal, to obtain second test result information.

Step 604: After obtaining the second test result information, the main machine travels to a next region until all regions have been tested.

Figure 9:
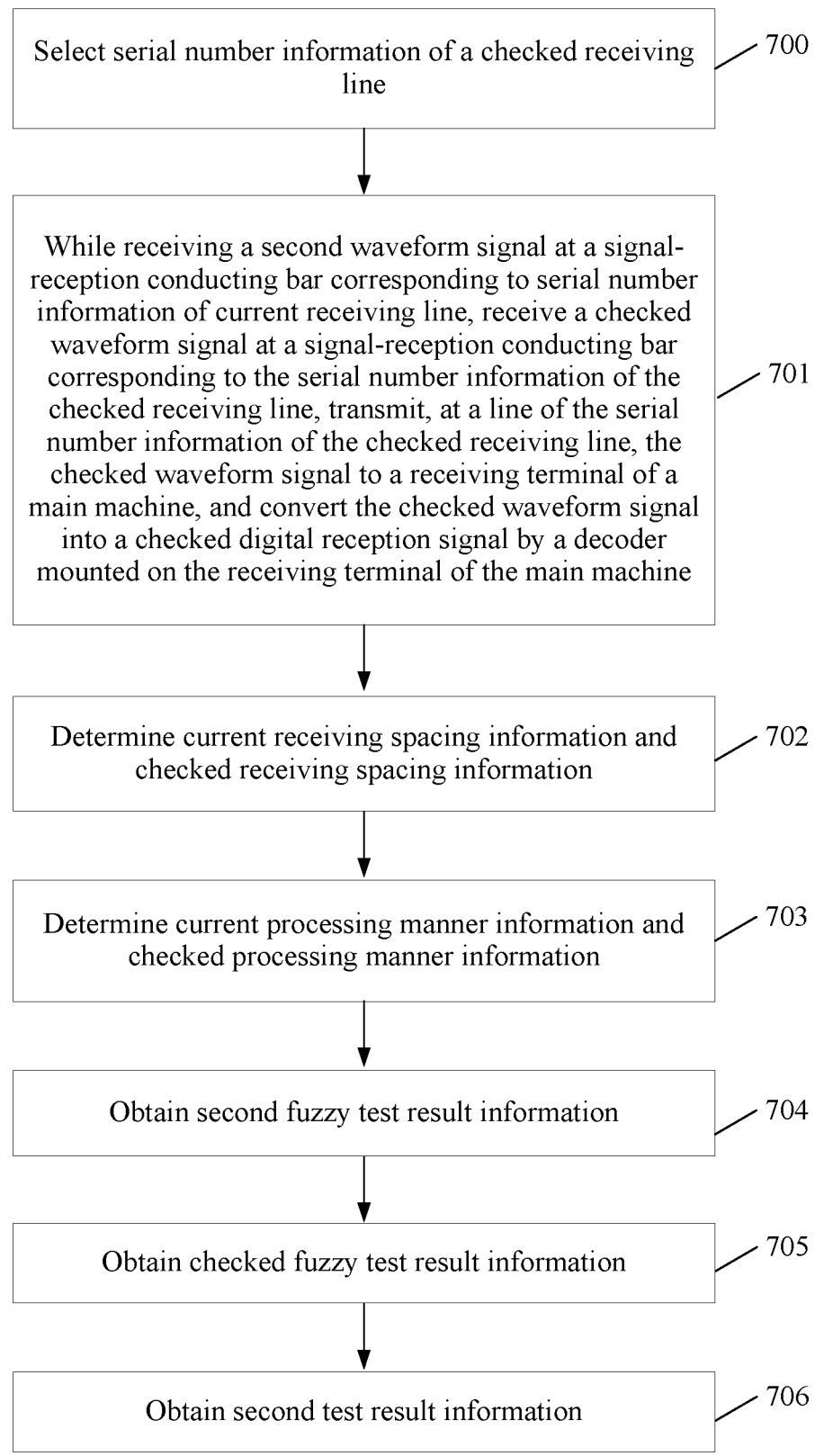
FIG. 9 is a flowchart of a method for analyzing a second digital reception signal to obtain second test result information according to an embodiment 3 of this application.

Referring to FIG. 9, a method for analyzing a second digital reception signal to obtain second test result information includes the following steps.

Step 700: Arbitrarily select a serial number of a line corresponding to the serial number information of the receiving line, and define the serial number information of the receiving line as serial number information of a checked receiving line.

The serial number information of the checked receiving line is information about a serial number of a line of a signal-reception conducting bar in another signal conducting bar group that is not a same signal conducting bar group, preferably an adjacent signal conducting bar group.

Step 701: While receiving a second waveform signal at the signal-reception conducting bar corresponding to the serial number information of the current receiving line, receive a checked waveform signal at a signal-reception conducting bar corresponding to the serial number information of the checked receiving line, transmit, at a line of the serial number information of the checked receiving line, the checked waveform signal to a receiving terminal of the main machine, and convert the checked waveform signal into a checked digital reception signal by a decoder mounted on the receiving terminal of the main machine.

The checked waveform signal is a waveform signal received at the signal-reception conducting bar corresponding to the serial number information of the checked receiving line. A coincidence with the second waveform signal is that a signal that the serial number information of the current input line is sent to the lining is obtained by transferring, and a difference lies in that the signal is received by a different signal conducting bar.

Step 702: Determine current receiving spacing information and checked receiving spacing information based on the location information of the signal conducting bar group, the serial number information of the checked receiving line, the serial number information of the current receiving line, and the serial number information of the current input line.

The current receiving spacing information is about a distance between the signal-reception conducting bar corresponding to the serial number information of the current receiving line and the signal-transmission conducting bar corresponding to the serial number information of the current input line. The checked receiving spacing information is about a distance between the signal-reception conducting bar corresponding to the serial number information of the checked receiving line and the signal-transmission conducting bar corresponding to the serial number information of the current input line. A determining manner is to measure on site after construction and pouring are completed, that is, measure a distance between corresponding points after all rebars and signal conducting bars are drawn.

Step 703: Separately perform matching analysis on the current receiving spacing information and the checked receiving spacing information based on processing manner information stored in a preset integration database, to determine a signal processing manner that is separately corresponding to the current receiving spacing information and the checked receiving spacing information, define the processing manner corresponding to the current receiving spacing information as current processing manner information, and define the processing manner corresponding to the checked receiving spacing information as checked processing manner information.

The current processing manner information is about a manner of processing a signal received based on the current receiving spacing information. The checked processing manner information is about a manner of processing a signal received based on the checked spacing information. A mapping relationship between the processing manner information and the receiving spacing information is stored in a database, verified and set by persons skilled in the art according to theoretical knowledge and a test result. When receiving the current receiving spacing information and the checked receiving spacing information, a system automatically finds a corresponding processing manner from the database, and separately outputs the corresponding processing manner as the current processing manner information and the checked processing manner information.

Step 704: Process the second digital reception signal in the current processing manner information, to obtain second fuzzy test result information.

The second fuzzy test result information is test result information transformed after the second digital reception signal is processed based on the current processing manner information. The test result is transmission and reception of a single signal with a specific limitation, that is, There might be an acceptable error between the detection result and the actual result. Therefore, the test result information is a fuzzy test result.

Step 705: Process the checked digital reception signal based on the checked processing manner information, to obtain checked fuzzy test result information.

The checked fuzzy test result information is test result information transferred after the checked digital reception signal is processed based on the checked processing manner information.

Step 706: Integrate the second fuzzy test result information with checked fuzzy test result information, to obtain the second test result information.

Equivalently, a one-transmit and multiple-receive manner is used to improve accuracy of the testing.

Figure 10:
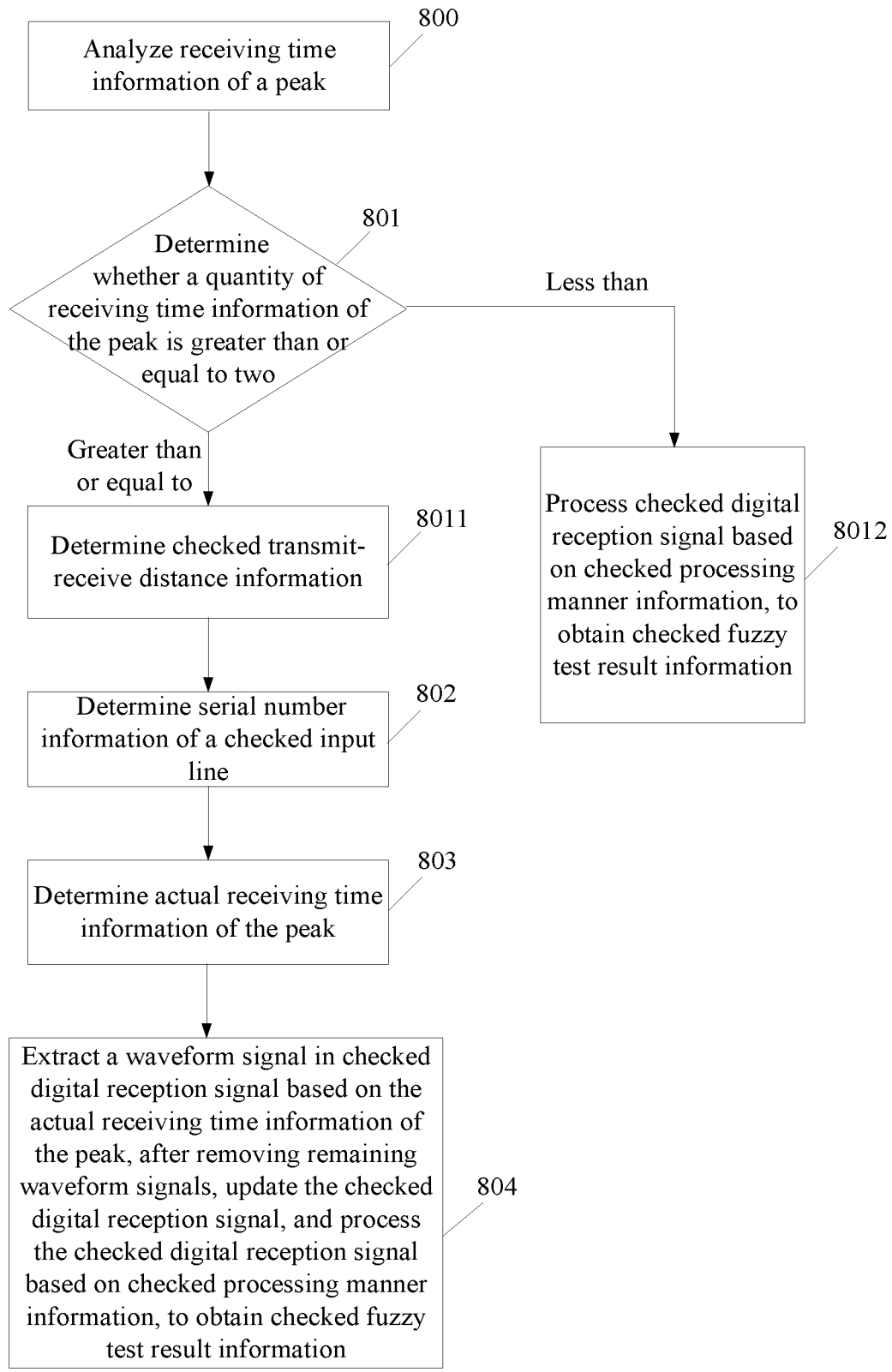
FIG. 10 is a flowchart of a method for processing a checked digital reception signal based on checked processing manner information to obtain checked fuzzy test result information according to an embodiment 3 of this application.

Referring to FIG. 10, a method for processing checked digital reception signal based on checked processing manner information to obtain checked fuzzy test result information includes the following steps.

Step 800: Analyze receiving time information of a peak of a signal in the checked digital reception signal.

The receiving time information of the peak is information about a time node at which a peak of a received waveform appears. Because a distance between a signal-transmission conducting bar and a signal-reception conducting bar is different, when a distance between dipoles changes, a receiving time point at which the peak appeasers is different, assistance may be performed based on an amplitude of the magnitude, to improve analysis accuracy.

Step 801: Determine whether a quantity of receiving time information of the peak is greater than or equal to two.

A purpose of determining is to determine whether a plurality of transmitted signals are received.

Step 8011: If the quantity of receiving time information of the peak is greater than or equal to two, perform matching analysis on all pieces of receiving time information of the peak in sequence based on transmit-receive distance information stored in a preset structural database, to determine a transmit-receive distance corresponding to different receiving time information of the peak, and define a transmit-receive distance corresponding to receiving time information of the peak as checked transmit-receive distance information.

The checked transmit-receive distance information is a corresponding amplitude of a signal that is received after the signal is transmitted at this distance is distance information of a magnitude of the receiving time information of the peak. A mapping relationship between the transmit-receive distance information and the receiving time information of the peak is stored in a database, obtained and recorded by persons skilled in the art based on time at which the peak is actually received in the geotechnical layer. When receiving the receiving time information of the peak, a system automatically finds a corresponding transmit-receive distance from the database, and outputs the corresponding transmit-receive distance as the checked transmit-receive distance information. If a quantity of reception time nodes is greater than or equal to two, more than one signal-transmission conducting bar transfers to a signal. In this case, there is more than one received waveform, but a corresponding distance may be determined based on the reception time node of the waveform, thereby determining which signal-transmission conducting bar transmits the signal.

Step 8012: If the quantity of receiving time information of the peak is less than two, process the checked digital reception signal based on the checked processing manner information, to obtain checked fuzzy test result information.

If the quantity of receiving time information of the peak is less than two, the quantity is usually one, and there is one waveform. Therefore, a corresponding signal is a signal transmitted by the transmitting terminal, and does not needs to be distinguished.

Step 802: Determine serial number information of a checked input line based on the checked transmit-receive distance information, the serial number information of the checked receiving line, and the location information of the signal conducting bar group.

The serial number information of the checked input line is serial number information of a checked input line that is corresponding to a signal-transmission conducting bar of which distance to the signal-reception conducting bar is the checked transmit-receive distance information and that is in the location information of the signal conducting bar group corresponding to the serial number information of the checked receiving line. A determining manner is to set the location of the conducting bar corresponding to the serial number information of the checked receiving line as an endpoint, add or subtract a distance value corresponding to the checked transmit-receive distance information to obtain a corresponding location, match this location with locations of signal-transmission conducting bars corresponding to all pieces of serial number information of the input line, and when the matching succeeds, record the matched location as the serial number information of the checked input line. In this case, each time point at which the peak is received is corresponding to one location, that is, corresponding to a serial number of one input line number.

Step 803: Perform matching on the serial number information of the current input line based on the serial number information of the checked input line, to determine receiving time information of the peak corresponding to the serial number information of the current input line, and define the receiving time information of the peak as actual receiving time information of the peak.

The actual receiving time information of the peak is information about a receiving time point of the peak corresponding to the signal-reception conducting bar corresponding to the serial number information of the checked receiving line corresponding to the serial number information of the current input line. A determining method is to match the two serial numbers. When the serial numbers are the same, the same serial number is a serial number corresponding to the actual receiving time information of the peak.

Step 804: Extract a waveform signal in the checked digital reception signal based on the actual receiving time information of the peak, after removing remaining waveform signals, update the checked digital reception signal, and process the checked digital reception signal based on the checked processing manner information, to obtain the checked fuzzy test result information.

Figure 11:
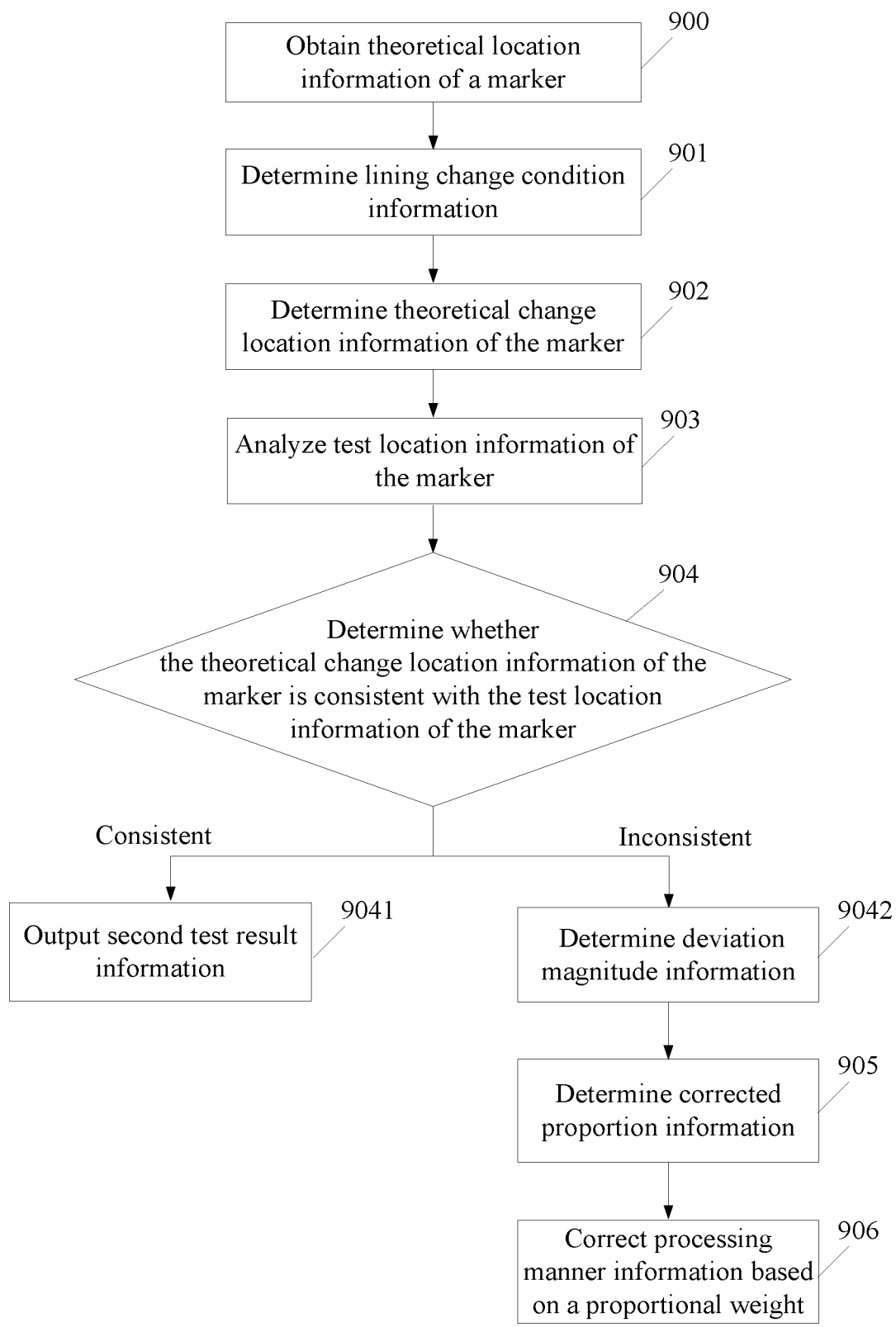
FIG. 11 is a flowchart of a method for checking second test result information according to an embodiment 3 of this application.

Referring to FIG. 11, the method for non-destructive testing of a tunnel lining further includes a method for checking second test result information, and the method includes the following steps.

Step 900: Obtain theoretical location information of a marker.

The theoretical location information of the marker is information about a location at which a marker is embedded in a specific location. A manner of obtaining the information is a manner of manually inputting.

Step 901: Determine lining change condition information based on the second test result information.

The lining change information is about a change in a lining when a test result is obtained. A determining manner is to perform mathematical modeling on all data, and determine a corresponding model as the lining change information, including a change in a depth and a change in a crack.

Step 902: Determine theoretical change location information of the marker based on the lining change condition information and the theoretical location information of the marker.

The theoretical change location information of the marker is information about a location of a marker after moving based on the theoretical location information of the marker and the lining change situation information.

Step 903: Analyze test location information of the marker based on the second test result information.

The test information of the marker is information about a special location in the second test result information. The lining change situation information is a result determined based on overall data of the second test result information, and the test location information of the marker is a result determined based on data of a middle special marked region.

Step 904: Determine whether the theoretical change location information of the marker is consistent with the test location information of the marker.

Step 9041: If the theoretical marker change location information is consistent with the marker test location information, normally output the second test result information.

Step 9042: If the theoretical change location information of the marker is inconsistent with the test location information of the marker, determine deviation magnitude information based on the theoretical marker change location information and the marker test location information.

The deviation magnitude information is about an amplitude of a deviation between the theoretical change location information of the marker and the test location information of the marker. A determining manner is to subtract the theoretical change location information of the marker and the test location information of the marker and divide by a reference value. Because the information has a specific error in practice, for example, a manually mounting error, a change in temperature, a change in humidity, a change in an environmental material, and the like, a test result is inaccurate. Therefore, the test result needs to be optimized, to output a more appropriate test result. This improves progress and credibility of the test. When necessary, a neural network training may be trained in the processing manner.

Step 905: Perform matching analysis on the deviation magnitude information based on a proportional weight information stored in a preset proportion database, to determine a proportional weight corresponding to the deviation magnitude information, and define the proportional weight as corrected proportion information.

The corrected proportion information is information for correcting, based on the test result information, on the weight according to a test algorithm that is parameterized by data and that is in the processing manner. A mapping relationship between the proportional weight information and the deviation magnitude information is stored in a database, and obtained by persons skilled in the art according to past experience and a large amount of experimental data after comprehensively considering information about a corresponding working condition of a tunnel, and a specific test manner and an arrangement form of the tunnel. When receiving the corresponding deviation magnitude information, a system automatically finds a corresponding proportional weight from the database, and outputs the corresponding proportional weight as corrected proportion information.

Step 906: Correct the processing manner information based on the proportional weight.

Based on the same inventive concept, an embodiment of the present disclosure discloses a system for non-destructive testing of a tunnel lining.

Figure 12:
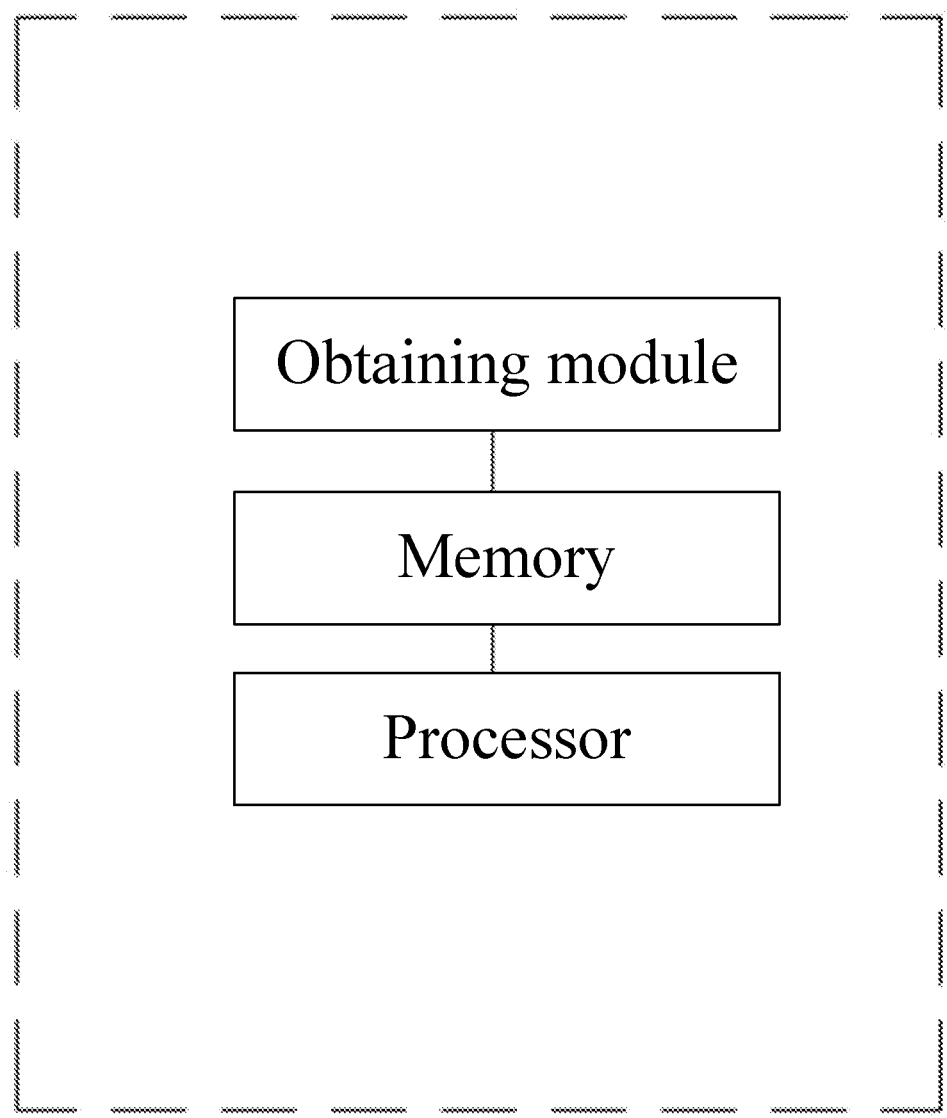
FIG. 12 is a diagram of system modules in a method for non-destructive testing of a tunnel lining according to an embodiment of this application.

Referring to FIG. 12, the system for non-destructive testing of a tunnel lining includes an obtaining module, a memory, and a processor.

The obtaining module is configured to obtain tunnel design information, first test region information, required test depth information, test signal type information, second test region information, and theoretical location information of a marker.

The memory is configured to store a program for a method for controlling the method for non-destructive testing of a tunnel lining.

In the processor, the program in the memory is loaded and executed by the processor, to implement the method for controlling the method for non-destructive testing of a tunnel lining.

Those skilled in the art can clearly understand that, for convenience and conciseness of description, only the division of the foregoing function modules is used as an example. In practical applications, the foregoing functions may be allocated to and completed by different function modules as required, that is, an internal structure of the apparatus is divided into different function modules to complete all or some of the functions described above. For a specific working process of the system, apparatus, and unit described above, refer to the corresponding process in the foregoing method embodiments. Details are not described herein again.

The above described are preferred examples of this application, but the protection scope of this application is not limited thereto. Any feature disclosed in this specification (including abstract and drawings), unless specifically stated, may be replaced by other alternative features with equivalent or similar purposes. That is, unless specifically stated, each feature is just one example of a series of equivalent or similar features.

What is claimed is:

1. A method for non-destructive testing of a tunnel lining, comprising:

obtaining tunnel design information before tunnel construction;

extracting rebar arrangement information and lining information based on the tunnel design information;

performing matching analysis on the tunnel design information based on arrangement interval information stored in a preset arrangement database, to determine an arrangement interval corresponding to the tunnel design information, and defining the arrangement interval as theoretical arrangement interval information, wherein the theoretical arrangement interval information is about an interval distance that is in a length direction of an arc of a lining between a signal conducting bar added to the lining and rebars on two sides each, and information about an interval distance between a signal conducting bar and a signal conducting bar;

determining location information of a signal conducting bar group based on the lining information and the theoretical arrangement interval information, wherein each of signal conducting bar groups comprises a signal-transmission conducting bar and a signal-reception conducting bar, one end of the signal-transmission conducting bar is a signal transmitting point, the other end of the signal-transmission conducting bar is a signal input connection point, one end of the signal-reception conducting bar is a signal receiving point, and the other end of the signal-reception conducting bar is a signal output connection point;

pre-embedding signal conducting bars in sequence based on the location information of the signal conducting bar group, wherein the signal transmitting point and the signal receiving point are located on a side, close to a geotechnical layer, of the lining, and the signal input connection point and the signal receiving point are located on a side, away from the geotechnical layer, of the lining; and manufacturing the lining, mounting an interface slot based on a location of the signal conducting bar, and marking a location of each interface slot as input point location information or receiving point location information, wherein the input point location information indicates a location corresponding to the signal input connection point, and the receiving point location information indicates a location corresponding to the signal receiving point;

wherein the method for non-destructive testing of a tunnel lining further comprises a process for testing by a main machine, comprising:

obtaining first test region information;

performing matching analysis on the first test region information based on the input point location information and the receiving point location information that are stored in a preset distribution database, to determine an input point location and a receiving point location that are corresponding to the first test region information, defining the input point location as current input point location information, and defining the receiving point location as current receiving point location information;

after enabling the main machine to travel to the first test region information along a preset track, inserting a transmitting terminal of the main machine at the current input point location information, to be connected to a corresponding signal input connection point, and inserting a receiving terminal of the main machine at the current receiving point location information, to be connected to a corresponding signal output connection point;

converting, by the transmitting terminal of the main machine, a preset first digital transmission signal into a preset first analog signal by an encoder mounted on the transmitting terminal of the main machine, and inputting the preset first analog signal from a signal input connection point corresponding to the current input point location information, transmitting, by a signal-transmission conducting bar corresponding to the current input point location information, an analog signal, receiving a preset first waveform signal at a signal-reception conducting bar corresponding to the current receiving point location information, sending the preset first waveform signal to the receiving terminal of the main machine from a signal-reception connection point corresponding to the current receiving point location information, and converting, by the receiving terminal of the main machine, the preset first waveform signal into a first digital reception signal by a decoder mounted on the receiving terminal of the main machine;

analyzing the first digital reception signal, to obtain first test result information;

after obtaining the first test result information, enabling the main machine to travel to a next region until all regions have been tested.

2. The method for non-destructive testing of a tunnel lining according to claim 1, wherein the method for inserting a transmitting terminal of the main machine at the current input point location information and inserting a receiving terminal of the main machine at the current receiving point location information comprises:

determining whether a quantity of current input point location information and current receiving point location information that are activated and that are in the first test region information is greater than one pair;

if the quantity of current input point location information and current receiving point location information that are activated and that are in the first test region information is greater than one pair, obtaining required test depth information and test signal type information;

performing matching analysis on the required test depth information and the test signal type information based on serial number information of the signal conducting bar group and receiving time window information that are stored in a preset depth database, to determine a serial number of the signal conducting bar group and a receiving time window that are corresponding to the required test depth information and the test signal type information, defining the serial number of the signal conducting bar group as serial number information of the required signal conducting bar group, and defining the receiving time window as required receiving time window information;

updating the current input point location information and the current receiving point location information based on the serial number information of the required signal conducting bar group and the location information of the signal conducting bar group;

inserting the transmitting terminal of the main machine at the current input point location information, inserting the receiving terminal of the main machine at the current receiving point location information, and receiving a signal based on the required receiving time window information; or if the quantity of current input point location information and current receiving point location information that are activated and that are in the first test region information is not greater than one pair, directly inserting the transmitting terminal of the main machine at the current input point location information, and inserting the receiving terminal of the main machine at the current receiving point location information.

3. A system for non-destructive testing of a tunnel lining, comprising:
an obtaining module, configured to obtain tunnel design information, first test region information, required test depth information, test signal type information, second test region information, and theoretical location information of a marker;
a memory, configured to store a program for a method for controlling the method for non-destructive testing of a tunnel lining according to claim 2; and
a processor, wherein the program in the memory is loaded and executed by the processor, to implement the method for controlling the method for non-destructive testing of a tunnel lining according to claim 2.

4. The method for non-destructive testing of a tunnel lining according to claim 1, wherein the method for pre-embedding signal conducting bars in sequence based on the location information of the signal conducting bar group comprises:
determining staggered location information based on the rebar arrangement information and the location information of the signal conducting bar group;
determining whether the staggered location information exists;
if the staggered location information exists, determining staggered signal conducting bar information in the location information of the signal conducting bar group based on the staggered location information;
coating a rubber material on a surface of a rebar, and injecting epoxy resin between the rubber material and the rebar; or
if the staggered location information does not exist, determining conventional signal conducting bar information based on the location information of the signal conducting bar group; and
coating epoxy resin on a surface of a rebar.

5. A system for non-destructive testing of a tunnel lining, comprising:
an obtaining module, configured to obtain tunnel design information, first test region information, required test depth information, test signal type information, second test region information, and theoretical location information of a marker;
a memory, configured to store a program for a method for controlling the method for non-destructive testing of a tunnel lining according to claim 4; and
a processor, wherein the program in the memory is loaded and executed by the processor, to implement the method for controlling the method for non-destructive testing of a tunnel lining according to claim 4.

6. A system for non-destructive testing of a tunnel lining, comprising:
an obtaining module, configured to obtain tunnel design information, first test region information, required test depth information, test signal type information, second test region information, and theoretical location information of a marker;
a memory, configured to store a program for a method for controlling the method for non-destructive testing of a tunnel lining according to claim 1; and
a processor, wherein the program in the memory is loaded and executed by the processor, to implement the method for controlling the method for non-destructive testing of a tunnel lining according to claim 1.

7. A method for non-destructive testing of a tunnel lining, comprising:
obtaining tunnel design information before tunnel construction;
extracting rebar arrangement information and lining information based on the tunnel design information;
performing matching analysis on the tunnel design information based on arrangement interval information stored in a preset arrangement database, to determine an arrangement interval corresponding to the tunnel design information, and defining the arrangement interval as theoretical arrangement interval information, wherein the theoretical arrangement interval information is about an interval distance that is in a length direction of an arc of a lining between a signal conducting bar added to the lining and rebars on two sides each, and information about an interval distance between a signal conducting bar and a signal conducting bar;
determining location information of a signal conducting bar group based on the lining information and the theoretical arrangement interval information, wherein each of signal conducting bar groups comprises a signal-transmission conducting bar and a signal-reception conducting bar, one end of the signal-transmission conducting bar is a signal transmitting point, the other end of the signal-transmission conducting bar is a signal input connection point, one end of the signal-reception conducting bar is a signal receiving point, and the other end of the signal-reception conducting bar is a signal output connection point;
pre-embedding signal conducting bars in sequence based on the location information of the signal conducting bar group, wherein the signal transmitting point and the signal receiving point are located on a side, close to a geotechnical layer, of the lining, and the signal input connection point and the signal receiving point are located on a side, away from the geotechnical layer, of the lining; and
manufacturing the lining, mounting an interface slot based on a location of the signal conducting bar, and marking a location of each interface slot as input point location information or receiving point location information, wherein the input point location information indicates a location corresponding to the signal input connection point, and the receiving point location information indicates a location corresponding to the signal receiving point; and the method for non-destructive testing of a tunnel lining further comprises a process for testing by a main machine, comprising:

obtaining second test region information;

performing matching analysis on the second test region information based on serial number information of an input line and serial number information of a receiving line that are stored in a preset line database, to determine a serial number of an input line and a serial number of a receiving line that are corresponding to the second test region information, defining the serial number of the input line as serial number information of a current input line, and defining the serial number of the receiving line as serial number information of a current receiving line;

inputting, at a line of the serial number information of the current input line, a preset second analog signal that is converted by an encoder mounted on a transmitting terminal of the main machine, transmitting, by a signal-transmission conducting bar corresponding to the serial number information of the current input line, the preset second analog signal, receiving a second waveform signal at a signal-reception conducting bar corresponding to the serial number information of the current receiving line, transmitting the second waveform signal to a receiving terminal of the main machine from a line of the serial number information of the current receiving line, and converting the second waveform signal into a second digital reception signal by a decoder mounted on the receiving terminal of the main machine;

analyzing the second digital reception signal, to obtain second test result information; and after obtaining the second test result information, enabling the main machine to travel to a next region until all regions have been tested.

8. The method for non-destructive testing of a tunnel lining according to claim 7, wherein the method for analyzing the second digital reception signal, to obtain second test result information comprises:

arbitrarily selecting a serial number of a line corresponding to the serial number information of the receiving line, and defining the serial number information of the receiving line as serial number information of a checked receiving line;

while receiving the second waveform signal at the signal-reception conducting bar corresponding to the serial number information of the current receiving line, receiving a checked waveform signal at a signal-reception conducting bar corresponding to the serial number information of the checked receiving line, transmitting, at a line of the serial number information of the checked receiving line, the checked waveform signal to the receiving terminal of the main machine, and converting the checked waveform signal into a checked digital reception signal by using the decoder mounted on the receiving terminal of the main machine;

determining current receiving spacing information and checked receiving spacing information based on the location information of the signal conducting bar group, the serial number information of the checked receiving line, the serial number information of the current receiving line, and the serial number information of the current input line, wherein the current receiving spacing information is about a distance between the signal-reception conducting bar corresponding to the serial number information of the current receiving line and the signal-transmission conducting bar corresponding to the serial number information of the current input line, the checked receiving spacing information is about a distance between the signal-reception conducting bar corresponding to the serial number information of the checked receiving line and the signal-transmission conducting bar corresponding to the serial number information of the current input line;

separately performing matching analysis on the current receiving spacing information and the checked receiving spacing information based on processing manner information stored in a preset integration database, to determine a signal processing manner that is separately corresponding to the current receiving spacing information and the checked receiving spacing information, defining the processing manner corresponding to the current receiving spacing information as current processing manner information, and defining the processing manner corresponding to the checked receiving spacing information as checked processing manner information;

processing the second digital reception signal in a processing manner corresponding to the current processing manner information, to obtain second fuzzy test result information;

processing the checked digital reception signal in a processing manner corresponding to the checked processing manner information, to obtain checked fuzzy test result information; and integrating the second fuzzy test result information with checked fuzzy test result information, to obtain the second test result information.

9. The method for non-destructive testing of a tunnel lining according to claim 8, wherein the method for processing the checked digital reception signal in a processing manner corresponding to the checked processing manner information, to obtain checked fuzzy test result information comprises:

analyzing receiving time information of a peak of a signal in the checked digital reception signal;

determining whether a quantity of receiving time information of the peak is greater than or equal to two;

if the quantity of receiving time information of the peak is greater than or equal to two, performing matching analysis on all pieces of receiving time information in sequence based on transmit-receive distance information stored in a preset structural database, to determine a transmit-receive distance corresponding to different receiving time information of the peak, and defining the transmit-receive distance corresponding to the receiving time information of the peak as checked transmit-receive distance information;

determining serial number information of a checked input line based on the checked transmit-receive distance information, the serial number information of the checked receiving line, and the location information of the signal conducting bar group;

performing matching on the serial number information of the current input line based on the serial number information of the checked input line, to determine receiving time information of the peak corresponding to the serial number information of the current input line, and defining the receiving time information of the peak as actual receiving time information of the peak;

extracting a waveform signal in the checked digital reception signal based on the actual receiving time information of the peak, after removing remaining waveform signals, updating the checked digital reception signal, and processing the checked digital reception signal in the processing manner corresponding to the checked processing manner information, to obtain the checked fuzzy test result information; or if the quantity of receiving time information of the peak is less than two, processing the checked digital reception signal in the processing manner corresponding to the checked processing manner information, to obtain the checked fuzzy test result information.

10. A system for non-destructive testing of a tunnel lining, comprising:

an obtaining module, configured to obtain tunnel design information, first test region information, required test depth information, test signal type information, second test region information, and theoretical location information of a marker;

a memory, configured to store a program for a method for controlling the method for non-destructive testing of a tunnel lining according to claim 9; and a processor, wherein the program in the memory is loaded and executed by the processor, to implement the method for controlling the method for non-destructive testing of a tunnel lining according to claim 9.

11. A system for non-destructive testing of a tunnel lining, comprising:

an obtaining module, configured to obtain tunnel design information, first test region information, required test depth information, test signal type information, second test region information, and theoretical location information of a marker;

a memory, configured to store a program for a method for controlling the method for non-destructive testing of a tunnel lining according to claim 8; and a processor, wherein the program in the memory is loaded and executed by the processor, to implement the method for controlling the method for non-destructive testing of a tunnel lining according to claim 8.

12. The method for non-destructive testing of a tunnel lining according to claim 7, further comprising a method for checking the second test result information, wherein the method comprises:

obtaining theoretical location information of a marker;

determining lining change condition information based on the second test result information;

determining theoretical change location information of the marker based on the lining change condition information and the theoretical location information of the marker;

analyzing test location information of the marker based on the second test result information;

determining whether the theoretical change location information of the marker is consistent with the marker test location information;

if the theoretical change location information of the marker is consistent with the marker test location information, normally outputting the second test result information;

if the theoretical change location information of the marker is inconsistent with the test location information of the marker, determining deviation magnitude information based on the theoretical change location information of the marker and the test location information of the marker;

performing matching analysis on the deviation magnitude information based on a proportional weight information stored in a preset proportion database, to determine a proportional weight corresponding to the deviation magnitude information, and defining the proportional weight as corrected proportion information; and correcting the processing manner information based on the proportional weight.

13. A system for non-destructive testing of a tunnel lining, comprising:

an obtaining module, configured to obtain tunnel design information, first test region information, required test depth information, test signal type information, second test region information, and theoretical location information of a marker;

a memory, configured to store a program for a method for controlling the method for non-destructive testing of a tunnel lining according to claim 12; and a processor, wherein the program in the memory is loaded and executed by the processor, to implement the method for controlling the method for non-destructive testing of a tunnel lining according to claim 12.

14. A system for non-destructive testing of a tunnel lining, comprising:

an obtaining module, configured to obtain tunnel design information, first test region information, required test depth information, test signal type information, second test region information, and theoretical location information of a marker;

a memory, configured to store a program for a method for controlling the method for non-destructive testing of a tunnel lining according to claim 7; and a processor, wherein the program in the memory is loaded and executed by the processor, to implement the method for controlling the method for non-destructive testing of a tunnel lining according to claim 7.

* * * * *